United States Patent [19]
Allaire et al.

[11] Patent Number: 4,618,296
[45] Date of Patent: Oct. 21, 1986

[54] CUTTING TOOL AND INSERT THEREFOR

[75] Inventors: Paul B. Allaire, Troy; Daniel R. Stashko, Holly, both of Mich.

[73] Assignee: GTE Valeron Corporation, Troy, Mich.

[21] Appl. No.: 781,205

[22] Filed: Jun. 28, 1985

Related U.S. Application Data

[63] Continuation of Ser. No. 531,844, Sep. 14, 1983, abandoned.

[51] Int. Cl.⁴ .............................................. B23C 5/02
[52] U.S. Cl. ...................................... 407/42; 407/54; 407/62; 407/113; 408/224; 408/713
[58] Field of Search ................... 407/36, 41, 42, 34, 407/35, 53, 54, 61, 62, 15, 113, 114, 48; 408/713, 224

[56] References Cited

U.S. PATENT DOCUMENTS

| | | | |
|---|---|---|---|
| 3,279,034 | 10/1966 | Kaiser | 407/113 |
| 3,696,484 | 10/1972 | Spriggs | 407/41 |
| 4,132,493 | 1/1979 | Hosoi | 407/54 |
| 4,175,896 | 11/1979 | Kishinami et al. | 407/53 |
| 4,252,480 | 2/1981 | Mizuno et al. | 407/113 |
| 4,411,564 | 10/1983 | Johnson | 407/42 |

FOREIGN PATENT DOCUMENTS

| | | | |
|---|---|---|---|
| 111188 | 8/1979 | Japan | 407/54 |
| 157418 | 12/1980 | Japan | 407/41 |

OTHER PUBLICATIONS

Manufacturing Engineering, May 1983, Ingersoll Advertisement.

Primary Examiner—Francis S. Husar
Assistant Examiner—Jerry Kearns
Attorney, Agent, or Firm—David J. Koris

[57] ABSTRACT

A cutting tool, for example a milling cutter, capable of omini-directional machining of a workpiece as disclosed. In a preferred form, the cutting tool is embodied as a ball nosed end mill having a cylindrical shank terminating in a spherically shaped cutting end with recesses shaped for receipt of at least two indexable cutting inserts, each insert mounted in lay-down fashion, and providing a portion of an effective overall arcuate cutting edge, the cutting zones of each insert overlapping each other. Each insert has the form of an equilateral polygon bounded by planar flanks, each flank intersecting a convex portion of a major face of an insert to form an arcuate cutting edge. The convex major face portion forms the clearance face and the planar flank portion the rake face for each associated arcuate cutting edge.

13 Claims, 10 Drawing Figures

CUTTING TOOL AND INSERT THEREFOR

This application is a continuation of application Ser. No. 531,844, filed on Sept. 14, 1983 and now abandoned.

BACKGROUND OF THE INVENTION

1. Field of the Invention

The invention relates generally to the field of chip forming cutting tools utilizing indexable cutting bits or inserts. More particularly, the invention pertains to a spherical or ball nosed end mill having a cylindrical shank and mechanically held, multiple edge cutting inserts on its spherical cutting end with arcuate cutting edges for forming a radiused cut.

2. Description of the Prior Art

Ball nosed end mills are known which can perform omni-directional cutting and contouring of irregular shapes on workpieces. One class of such prior art tools features cutting edges integrally formed with the cutter body or cemented carbide cutting elements brazed onto the cutter body. Such designs require considerable manufacturing effort and their cutting edges can be reground or sharpened only with considerable difficulty and with the required use of suitable grinding machines. After regrinding, a loss of diametrical size occurs, necessitating careful machine adjustments when the reground tool is returned to service. Those tools with integrally formed cutting blades are of a single material and therefore are limited to use on certain narrow categories of workpiece materials. One such known brazed tool is disclosed in U.S. Pat. No. 4,132,493 -Hosoi, issued Jan. 2, 1979.

A second class of known ball nosed mills features indexable cutting elements or inserts. Such tools are disclosed, for example, in U.S. Pat. No. 4,175,896 - Kishinami et al., issued Nov. 27, 1979 and U.S. Pat. No. 4,252,400 - Mizuno et al., issued Feb. 24, 1981. The Kishinami et al. reference discloses an insert with a conical rake or chip engaging surface, while the Mizuno et al. patent teaches inserts mounted in a so-called "stand-up" position with each insert's minor dimension lying behind the cutting edge and receiving the cutting forces generated. Additionally, Mizuno et al. specifically teaches non-overlapping of the cutting zones of each insert employed in the cut. Milling cutters with inserts mounted in stand-up position require more mounting room thereby leading to lowered rigidity of the cutter body. Additionally, inserts in the stand-up mounting arrangement are subjected to maximum cutting forces through a minimum dimension of the insert body material. Cutters employing inserts with non-planar rake faces produce narrower, stringy chips of non-uniform width which are more prone to chip clogging conditions in the cut.

SUMMARY OF THE INVENTION

An improved cutting tool for generating arcuate profiles is disclosed and is embodied as a ball nosed end mill having a cylindrical shank terminating in a spherically shaped cutting end. The cutting end includes at least two cavities shaped for lay-down mounting receipt of first and second cutting inserts, each insert presenting an arcuate cutting edge with a radius of curvature equal to the radius of the cut to be taken. The arcuate cutting edge of the first insert extends radially outwardly from the longitudinal axis of the shank. The cutting zone of the second insert overlaps that of the first insert. Each insert has first and second major faces in the form of equilateral polygons connected by planar flank surfaces. The first major face includes convex portions intersecting each flank surface in an acute angle to form identical arcuate cutting edges along each side of the polygon. The second major face is planar and intersects each flank surface in an obtuse angle. Mounting the fully indexable inserts in the so-called "lay-down" or "on-edge" configuration results in placing the major dimension of the insert body behind the active cutting edge to enable the insert to better withstand the cutting forces imposed on it. Additionally, lay-down insert mounting results in shallower mounting cavities in the tool body, thereby providing added strength and rigidity thereto.

BRIEF DESCRIPTION OF THE DRAWING

The objects and features of the invention will become apparent from a reading of a detailed description of a preferred embodiment, taken in conjunction with the drawing, in which.

DETAILED DESCRIPTION

Figure 1:
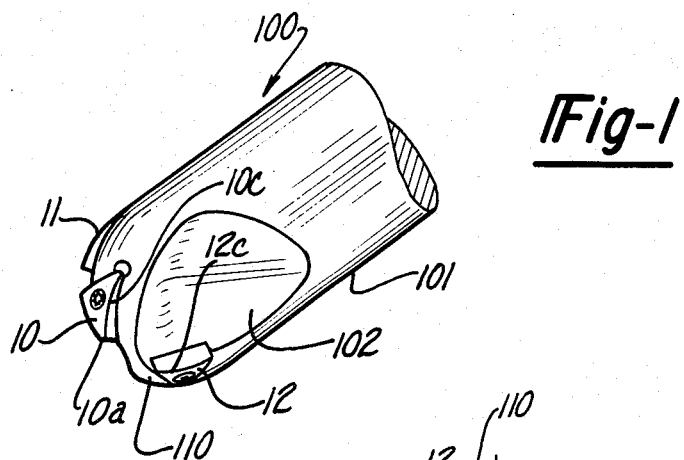
FIG. 1 is a perspective view of a ball nosed end mill designed in accordance with the principles of the invention.

With reference to FIGS. 1-4, a ball nosed end mill 100 has a substantially cylindrical shank 101 terminating in a substantially spherical cutting end 110 and a mounting end (not shown) which can be fashioned in any of a number of conventional shapes for retention by a machine spindle or tool mounting device.

In the spherical cutting end 110 are positoned mounting cavities for indexable cutting inserts mounted in so-called "lay-down" or "on-edge" configuration —i.e. with a major dimension of the insert lying rearwardly of the active cutting edge whereby a major face of the insert acts as a clearance face, while the minor flank faces serve as rake or chip engaging surfaces for their respective cutting edges. In the embodiment illustrated, the ball nosed end mill 100 has three cavities for mating lay-down receipt of three inserts 10, 11 and 12. This invention contemplates the use of at least two cutting inserts. The number of inserts depend on the size of the inserts used along with the desired radius of the arcuate profile to be machined in a workpiece in a tool of the invention. Additionally, peripheral inserts (not shown) could be mounted along a portion of the cylindrical shank to extend the depth of cut taken by the disclosed cutting tool.

Chip gullet 102 is provided adjacent arcuate cutting edge 12c of insert 12, while chip gullet 103 lies adjacent arcuate cutting edges 10c and 11c of inserts 10 and 11, respectively. Edges 10c, 11c and 12c all lie in substantially the same axial plane. The cutting zone of insert 12 overlaps both those of insert 10 and insert 11. This is best seen with reference to FIG. 2 where a projection of insert 12 is shown in dashed phantom lines and is designated 12p. In this manner, inserts 10, 11 and 12 cut a continuous arcuate profile having a substantially uniform radius—i.e. a substantially hemispherical profile with no gaps due to insert spacing.

The radially innermost corner 10a of insert 10 intersects or extends just beyond longitudinal axis 44 of the cutter body shank. This provides strength and shear cutting action at the normally vulnerable center cutting portion of the tool.

Figure 2:
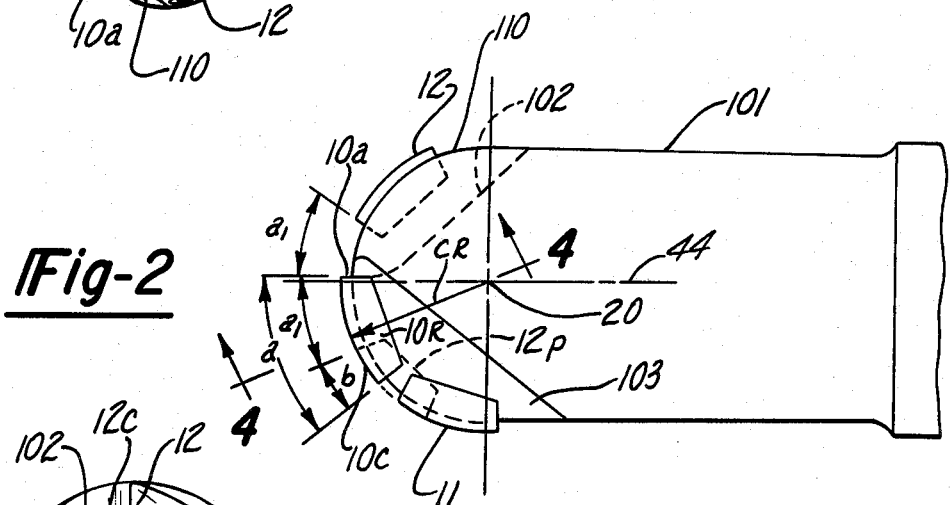
FIG. 2 is a plan view of the end mill of FIG. 1 taken normal to the longitudinal axis of the tool shank.
Figure 3:
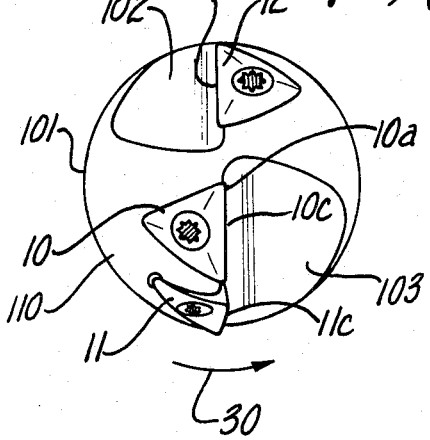
FIG. 3 is a plan view of the end mill of FIG. 1 taken parallel to the longitudinal axis of the tool shank from the cutting end.

The radially innermost end of cutting edge 12c lies, as seen from FIG. 2, at an angle $a_1$ from axis 44, and angle $a_1$ is less than angle a, the angle of the radially outermost end of cutting edge 10c with respect to axis 44. Hence, the cutting zone of insert 23 overlaps that of insert 10 by the angle b—i.e. $a = a_1 + b$. The purpose of this overlap is twofold. First, it prevents leaving of cusps on the work surface generated, and second, tool life is enhanced. In the area of overlap (angle b), inserts 10 and 12 are subjected to only one half the feed rate encountered where no overlap occurs (angle $a_1$). With no overlap, i.e. with angle $a_1$ equal to angle a, a minute amount of insert corner wear would cause the cutter body to impact the work surface.

Overlap b is equal to the angle created by lines extending from the center point 20 of the hemispherical cutting end 110 over the respective corner radii of insert 10 and of insert 12 projected 180° out of its mounting position as insert 12p. The magnitude of angle b is dependent upon three factors: insert inscribed circle diameter, insert corner radius, and cutter body diameter.

The side surfaces of inserts 10, 11 and 12, for example surface 10R of insert 10 (FIG. 2), are commonly referred to as flanks. However, when the inserts are mounted in lay-down fashion as shown, flank surface 10R becomes the chip engaging or rake face. The rake faces of the inserts of this invention are flat planar surfaces. In operation, chips are generated having substantially uniform thickness and flow freely across the unrestricted planar rake faces and are expelled via chip gullets 102 and 103. Arcuate rake faces, on the other hand, tend to result in thinner, stringy chips more prone to clogging.

Figure 4:
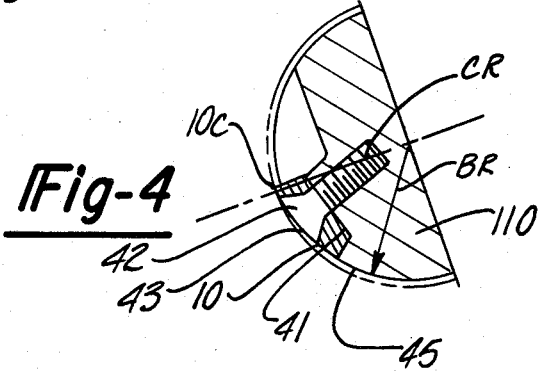
FIG. 4 is a sectional view taken along line 4—4 of FIG. 2.
Figure 5:
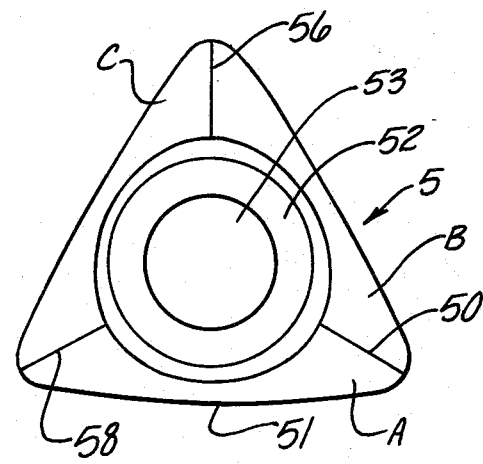
FIG. 5 is a top plan view of an indexable cutting insert designed in accordance with the principles of the invention.

In FIG. 4 it will be apparent that by positioning insert 10 angularly inwardly towards the tool axis, cutting clearance 43 is obtained. The insert's supporting cavity surface 41 is at a relatively shallow depth, approximately equaling the insert's thickness, thereby leaving substantial mass in body 110 surrounding the insert mounting cavities. This results in strong insert support and cutter body stiffness. The difference between the cutting radius CR and tool body radius BR equals cutter body clearance 45.

Also, as seen from FIG. 4, each insert has a countersunk cavity for receipt of an appropriately headed mounting screw member 42 which threadingly engages a tapped hole in body portion 110.

A preferred insert is set forth in FIGS. 5, 6, 7 and 7A. Insert 5 presents three identical arcuate cutting edges 51 and has the form of an equilateral triangle. It will be apparent to those skilled in the art that this invention is not limited to triangular inserts. Any equilateral polygonal shape can be utilized.

Figure 7:
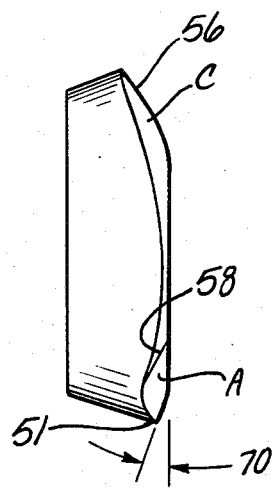
FIG. 7 is a side view of the insert of FIG. 5.
Figure 7A:
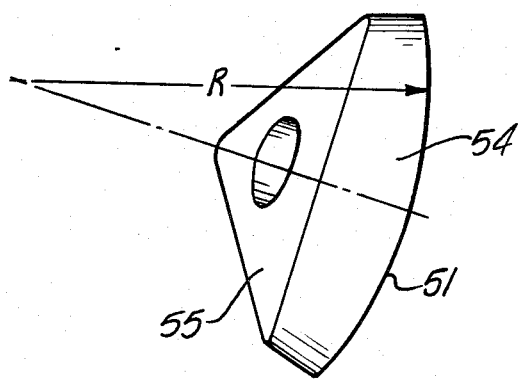
FIG. 7A is a perspective view of the insert of FIG. 5.
Figure 6:
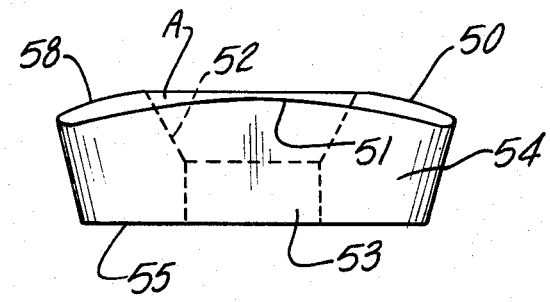
FIG. 6 is a front view of the insert of FIG. 5.

The equilateral triangular shape of insert 5 is formed by three planar flanks 54, a planar bottom mounting surface 55 and a major top face including three arcuate cylindrical surfaces A, B and C. Surfaces A, B and C have common boundaries at lines 50, 56 and 58. The intersection of surfaces A, B and C with a corresponding adjacent flank surface 54 provides three identical arcuate cutting edges 51 each having cutting radius R (FIG. 7A).

Surfaces A, B, and C have respective axes of generation generally transverse to their associated cutting edges and extending at an acute angle 70 to a plane parallel to the plane of surface 55. A preferred range of angle 70 runs from about 5 degrees to about 20 degrees and the value of angle 70 is governed by the cutter body diameter. The larger the cutter body diameter, the smaller is angle 70.

Faces 54 are sloped inwardly from cutting edges 51 to bottom face 55 such that each rake face 54 intersects its associated surface A, B or C in an acute angle and such that each rake face intersects planar surface 55 in an obtuse angle.

A central hole 53 having countersunk portion 52 is provided for receipt of a suitable insert mounting screw.

Planar surfaces 54 function as the rake faces while cylindrical surfaces A, B, and C function as clearance or relief surfaces for their respective cutting edges when insert 5 is mounted to body portion 110 of the ball nosed end mill 100 of FIGS. 1-4.

Figure 8:
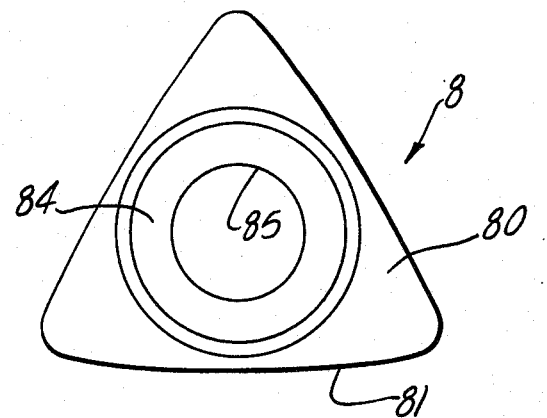
FIGS. 8 and 9 are respectively top and front views of an alternative body of an insert designed in accordance with the principles of the invention.
Figure 9:
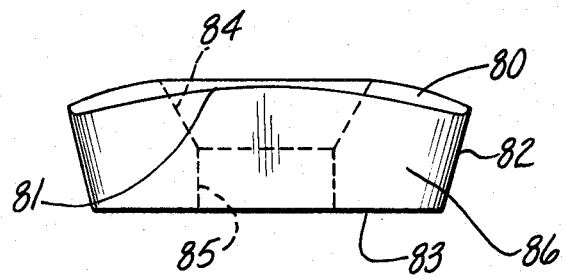

An alternative insert designed in accordance with the invention is shown in FIGS. 8 and 9. Insert 8 has an equilateral triangular shape bounded by three planar flank surfaces 86 sloping inwardly from major top surface 80 to bottom planar mounting surface 83. In this alternative embodiment, top surface 80 is spherical and intersects each flank surface 82 to form three identical arcuate cutting edges 81. A central aperture 85 with countersunk portion 84 is provided for receipt of a suitable mounting screw. When used with the cutting tool of FIGS. 1-4, flat surfaces 86 serve as rake faces for their respective cutting edges, and spherical surface 80 serves as a clearance or relief surface.

It is to be understood that specific embodiments of this invention have been described for the sake of example only. Other alternative arrangements within the scope of the appended claims will be apparent to those skilled in the art.

What is claimed is:

1. A cutting tool comprising:
   a cylindrical shank terminating in a spherical cutting end, the cutting end including first and second indexable cutting inserts each comprising first and second equilateral polygonal major faces, three identical planar flank surfaces forming the sides of the polygon with two of the flank surfaces intersecting at each corner thereof, the first major face including upwardly sloping convex portions intersecting each flank surface to form identical arcuate cutting edges along each side of the polygon, said convex portions including corresponding clearance face portions extending along said first major face rearwardly from said cutting edges, said second major face intersecting each flank at an obtuse angle forming identical rake edges; first and second mounting cavities shaped for respective receipt, in lay-down fashion of the first and second indexable cutting inserts; and means mounting the first and second indexable cutting inserts respectively to the first and second mounting cavities, the first cavity oriented such that an active arcuate cutting edge of the first insert placed in lay-down fashion in the first cavity will extend radially outwardly from a corner arc of the insert passing through a longitudinal axis of the shank, and the second cavity positioned on the cutting end with respect to the first cavity such that the second insert placed in lay-down fashion therein presents an active arcuate cutting edge whose cutting zone partially overlaps that of the first insert's cutting edge and extends the arcuate cutting action of the first insert substantially in a common plane passing through the shank axis, thereby enabling the cutting tool to generate an arcuate out of substantially uniform radius.

2. The cutting tool of claim 1 further comprising first and second chip gullets respectively intersecting the first and second cavities such that chips formed by the first and second active arcuate cutting edges are directed by the planar flank surfaces into the first and second chip gullets.

3. The cutting tool of claim 1 wherein said rake edge forms an angle with respect to an imaginary plane drawn from the cutting edge to a center point on the spherical cutter's rotational axis.

4. The cutting tool of claim 1 wherein said sloped convex portions form a maximum angle with respect to a plane parallel with said second major face so to reduce contact between said clearance face portion and work surface during radial cutting.

5. The cutting tool of claim 4 wherein said maximum angle is between about 5 degrees to about 20 degrees.

6. The cutting tool of claim 4 wherein the second major face of each insert is planar and rests upon a correspondingly planar mounting floor of its respective mounting cavity.

7. The cutting tool of claim 6 wherein each planar mounting floor is intersected by a threaded cavity in the spherical cutting end for receipt of an insert mounting screw.

8. The cutting tool of claim 7 wherein said first and second major faces are minimally spaced at the intersection of said flank surfaces.

9. A cutting tool comprising: a cylindrical shank terminating in a spherical cutting end, the cutting end including first and second indexable cutting inserts each comprising first and second equilateral polygonal major faces, three identical planar flank surfaces forming the sides of the polygon with two of the flank surfaces intersecting at each corner thereof, the first major face including upwardly sloping convex portions intersecting each flank surface to form identical arcuate cutting edges along each side of the polygon, said sloped convex portions form an angle with respect to a plane parallel with said second major face between about 5 degrees to about 20 degrees, said convexed portions including corresponding clearance face portions extending along said first major face rearwardly from said cutting edges, said second major face intersecting each flank at an obtuse angle forming identical rake edges, said rake edges form an angle with respect to an imaginary plane drawn from the cutting edge to the center point on the spherical cutters rotational axis, first and second mounting cavities shaped for respective receipt, in lay-down fashion of the first and second indexable cutting inserts, and means mounting the first and second indexable cutting inserts respectively to the first and second mounting cavities, the first cavity oriented such that an active arcuate cutting edge of the first insert placed in lay-down fashion in the first cavity will extend radially outwardly from a corner arc of the insert passing through a longitudinal axis of the shank, and the second cavity positioned on the cutting end with respect to the first cavity such that the second insert placed in the lay-down fashion therein presents an active arcuate cutting edge whose cutting zone partially overlaps that of the first insert's cutting edge and extends the arcuate cutting action of the first insert substantially in a common plane passing through the shank axis, thereby enabling the cutting tool to generate an arcuate cut of substantially uniform radius.

10. The cutting tool of claim 9 further comprising first and second chip gullets respectively intersecting the first and second cavities such that chips formed by the first and second active arcuate cutting edges are directed by the planar flank surfaces into the first and second chip gullets.

11. The cutting tool of claim 10 wherein the second major face of each insert is planar and rests upon a correspondingly planar mounting floor of its respective mounting cavity.

12. The cutting tool of claim 11 wherein each planar mounting floor is intersected by a threaded cavity in the spherical cutting end for receipt of an insert mounting screw.

13. The cutting tool of claim 12 wherein said first and second major faces are minimally spaced at the intersection of said flank surfaces.

* * * * *